US012676914B2

(12) United States Patent
Na et al.

(10) Patent No.: US 12,676,914 B2
(45) Date of Patent: Jul. 7, 2026

(54) METHOD AND DEVICE FOR DELETING RESOURCE IN M2M SYSTEM

(71) Applicant: NEO WIRELESS LLC, Wayne, PA (US)

(72) Inventors: Young Jin Na, Hwaseong (KR); Min Byeong Lee, Hwaseong (KR); Jae Seung Song, Seoul (KR)

(73) Assignee: NEO WIRELESS LLC, Wayne, PA (US)

( * ) Notice: Subject to any disclaimer, the term of this patent is extended or adjusted under 35 U.S.C. 154(b) by 783 days.

(21) Appl. No.: 17/599,834

(22) PCT Filed: May 4, 2020

(86) PCT No.: PCT/KR2020/005901
§ 371 (c)(1),
(2) Date: Sep. 29, 2021

(87) PCT Pub. No.: WO2020/231060
PCT Pub. Date: Nov. 19, 2020

(65) Prior Publication Data
US 2022/0164239 A1      May 26, 2022

Related U.S. Application Data

(60) Provisional application No. 62/905,673, filed on Sep. 25, 2019, provisional application No. 62/846,997, filed on May 13, 2019.

(51) Int. Cl.
*G06F 9/50* (2006.01)
*H04L 67/12* (2022.01)
(Continued)

(52) U.S. Cl.
CPC ............ *H04L 67/51* (2022.05); *G06F 9/5055* (2013.01); *H04L 67/12* (2013.01); *H04W 4/70* (2018.02)

(58) Field of Classification Search
None
See application file for complete search history.

(56) References Cited

U.S. PATENT DOCUMENTS 9,332,549 B2 *  5/2016  Lu .......................... H04L 67/288
9,426,222 B2 *  8/2016  Wang ...................... H04W 4/50
(Continued)

FOREIGN PATENT DOCUMENTS

CN       104954998 A      9/2015
CN       105101412 A      11/2015
(Continued)

OTHER PUBLICATIONS

Li et al. "Enabling Semantics in an M2M/IoT Service Delivery Platform", 2016 IEEE, pp. 206-213.*
(Continued)

*Primary Examiner* — Van H Nguyen
(74) *Attorney, Agent, or Firm* — Volpe Koenig

(57) ABSTRACT

A method for operating a machine-to-machine (M2M) device in an M2M system includes generating a request message including information associated to deletion of a resource, the deletion being performed in response to an operation, and transmitting the request message to a counterpart M2M device. The information includes at least one of information notifying that the resource is deleted in response to the operation, information indicating the resource, information indicating at least one operation that is a condition of the deletion, information indicating content of the condition, or information for identifying an entity that performs an operation causing the deletion.

15 Claims, 8 Drawing Sheets

(51) Int. Cl.
　　*H04L 67/51* 　　　(2022.01)
　　*H04W 4/70* 　　　(2018.01)

(56) References Cited

U.S. PATENT DOCUMENTS

| | | | | |
|---|---|---|---|---|
| 9,792,323 | B2 * | 10/2017 | Dong | H04W 4/70 |
| 9,900,728 | B2 * | 2/2018 | Kim | H04L 67/025 |
| 10,057,173 | B2 * | 8/2018 | Seed | H04W 4/08 |
| 10,085,244 | B2 * | 9/2018 | Ahn | H04W 72/20 |
| 2005/0149615 | A1 * | 7/2005 | Nedimyer | G06F 16/2322 |
| | | | | 709/202 |
| 2014/0016614 | A1 | 1/2014 | Velev et al. | |
| 2015/0023219 | A1 * | 1/2015 | Jin | H04M 15/93 |
| | | | | 370/259 |
| 2015/0074144 | A1 * | 3/2015 | Zhang | H04W 4/70 |
| | | | | 707/770 |
| 2016/0088420 | A1 | 3/2016 | Kim et al. | |
| 2016/0092490 | A1 | 3/2016 | Shimozono | |
| 2016/0112981 | A1 * | 4/2016 | Ahn | H04W 64/00 |
| | | | | 455/500 |
| 2016/0192111 | A1 * | 6/2016 | Choi | H04W 76/12 |
| | | | | 455/507 |
| 2016/0226847 | A1 | 8/2016 | Bone et al. | |
| 2016/0234691 | A1 | 8/2016 | Jeong et al. | |
| 2017/0099562 | A1 | 4/2017 | Bhalla | |
| 2017/0311303 | A1 * | 10/2017 | Ahn | H04W 72/20 |
| 2018/0225354 | A1 | 8/2018 | Li et al. | |
| 2023/0156086 | A1 | 5/2023 | Wang et al. | |

FOREIGN PATENT DOCUMENTS

| | | | |
|---|---|---|---|
| CN | 105210344 | A | 12/2015 |
| CN | 105282728 | A | 1/2016 |
| CN | 105653374 | A | 6/2016 |
| CN | 105723788 | A | 6/2016 |
| CN | 105794303 | A | 7/2016 |
| CN | 106537841 | A | 3/2017 |
| CN | 106790323 | A | 5/2017 |
| CN | 107016293 | A | 8/2017 |
| CN | 107431879 | A | 12/2017 |
| CN | 108141468 | A | 6/2018 |
| CN | 109565658 | A | 4/2019 |
| KR | 2016-0027855 | A | 3/2016 |
| KR | 2017-0115482 | A | 10/2017 |
| KR | 2018-0004501 | A | 1/2018 |
| KR | 101919488 | B1 | 11/2018 |
| KR | 2019-0000817 | A | 1/2019 |
| WO | 2016/126021 | A1 | 8/2016 |
| WO | 2017-155161 | A1 | 9/2017 |
| WO | 2018-236179 | A1 | 12/2018 |

OTHER PUBLICATIONS

Elmangoush et al. "Design of RESTful APIs for M2M Services", 2012 IEEE, pp. 50-56.*

"Functional Architecture", OneM2M Technical Specification, document No. oneM2M-TS-0001-V2.23.0, dated Feb. 27, 2019, 424 pages.

* cited by examiner

METHOD AND DEVICE FOR DELETING RESOURCE IN M2M SYSTEM

CROSS REFERENCE TO RELATED APPLICATION

The present application is a U.S. National Phase of International Application No. PCT/KR2020/005901 filed on May 4, 2020, which claims priority to U.S. provisional application No. 62/846,997 filed May 13, 2019 and a U.S. provisional application No. 62/905,673 filed Sep. 25, 2019, the entire contents of which are incorporated by reference herein.

BACKGROUND

(a) Technical Field

The present disclosure relates to a method and an apparatus for deleting a resource in a machine-to-machine (M2M) system, more particularly, to the method and apparatus for identifying a service entity that provides a suitable service platform for an application in an M2M system.

(b) Description of the Related Art

Recently, introduction of Machine-to-Machine (M2M) systems has occurred. An M2M communication may refer to a communication carried out between machines without human intervention. M2M may refer to Machine Type Communication (MTC), Internet of Things (IoT) or Device-to-Device (D2D). In the following description, the term "M2M" is used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information.

In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure relates to provide a method and an apparatus for setting a condition for deletion of a resource in an M2M system.

The present disclosure is directed to provide a method and an apparatus for deleting a resource without an explicit request according to satisfaction of a condition in an M2M system.

According to an embodiment of the present disclosure, a method for operating a machine-to-machine (M2M) device in an M2M system includes generating a request message including information associated to deletion of a resource, which is performed in response to an operation, and transmitting the request to a counterpart M2M device. The information includes at least one of information notifying that the resource is deleted in response to the operation, information indicating the resource, information indicating at least one operation that is a condition of the deletion, information indicating content of the condition, or information for identifying an entity that performs an operation causing the deletion.

According to an embodiment of the present disclosure, a method for operating an M2M device in an M2M system includes receiving a request message including information associated to deletion of a resource, which is performed in response to an operation, and deleting the resource when a condition set based on the information is satisfied. The information includes at least one of information notifying that the resource is deleted in response to the operation, information indicating the resource, information indicating at least one operation that is a condition of the deletion, information indicating content of the condition, or information for identifying an entity that performs an operation causing the deletion.

According to an embodiment of the present disclosure, an M2M device in an M2M system includes a transceiver configured to transmit and receive a signal and a processor configured to control the transceiver. The processor generates a request message including information associated to deletion of a resource, which is performed in response to an operation, and transmits the request message to a counterpart M2M device. The information includes at least one of information notifying that the resource is deleted in response to the operation, information indicating the resource, information indicating at least one operation that is a condition of the deletion, information indicating content of the condition, or information for identifying an entity that performs an operation causing the deletion.

According to the present disclosure, data in an M2M system may be adequately deleted according to a characteristic of an application or the data.

Effects obtained in the present disclosure are not limited to the above-mentioned effects, and other effects not mentioned above may be clearly understood by those skilled in the art from the following description.

DETAILED DESCRIPTION

Figure 1:
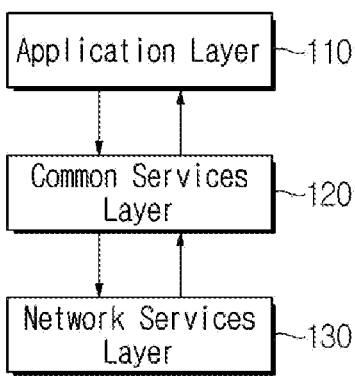
FIG. 1 is a view illustrating a layered structure of a Machine-to-Machine (M2M) system according to the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In addition, the present specification describes a network based on Machine-to-Machine (M2M) communication, and work in an M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station.

In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present disclosure mainly describes an M2M system but is not solely applied thereto.

In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

oneM2M is a de facto standards organization that was founded to develop a communal IoT service platform sharing and integrating application service infrastructure (platform) environments beyond fragmented service platform development structures limited to separate industries like energy, transportation, national defense and public service.oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure.

Referring to FIG. 1, a layered structure of an M2M system may consist of an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M).

The network services layer 130 may provide the common services layer 120 with services such as device management, location service and device triggering. Herein, an entity operating based on the network layer 120 may be a network service entity (NSE).

Figure 2:
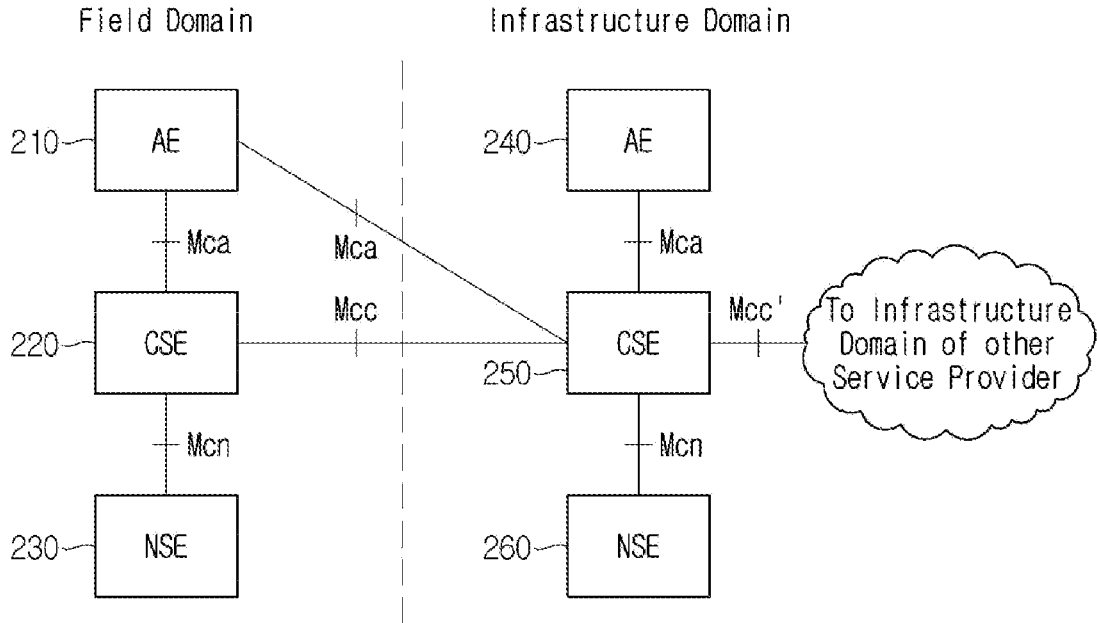
FIG. 2 is a view illustrating reference points in an M2M system according to the present disclosure.

FIG. 2 is a view illustrating reference points in an M2M system according to the present disclosure.

Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. Here, referring to FIG. 2, the reference point Mca between AE 210 or 240 and CSE 220 or 250, the reference point Mccbetween different CSEs and Mcn reference point between CSE 220 or 250 and NSE 230 or 260 may be set.

Figure 3:
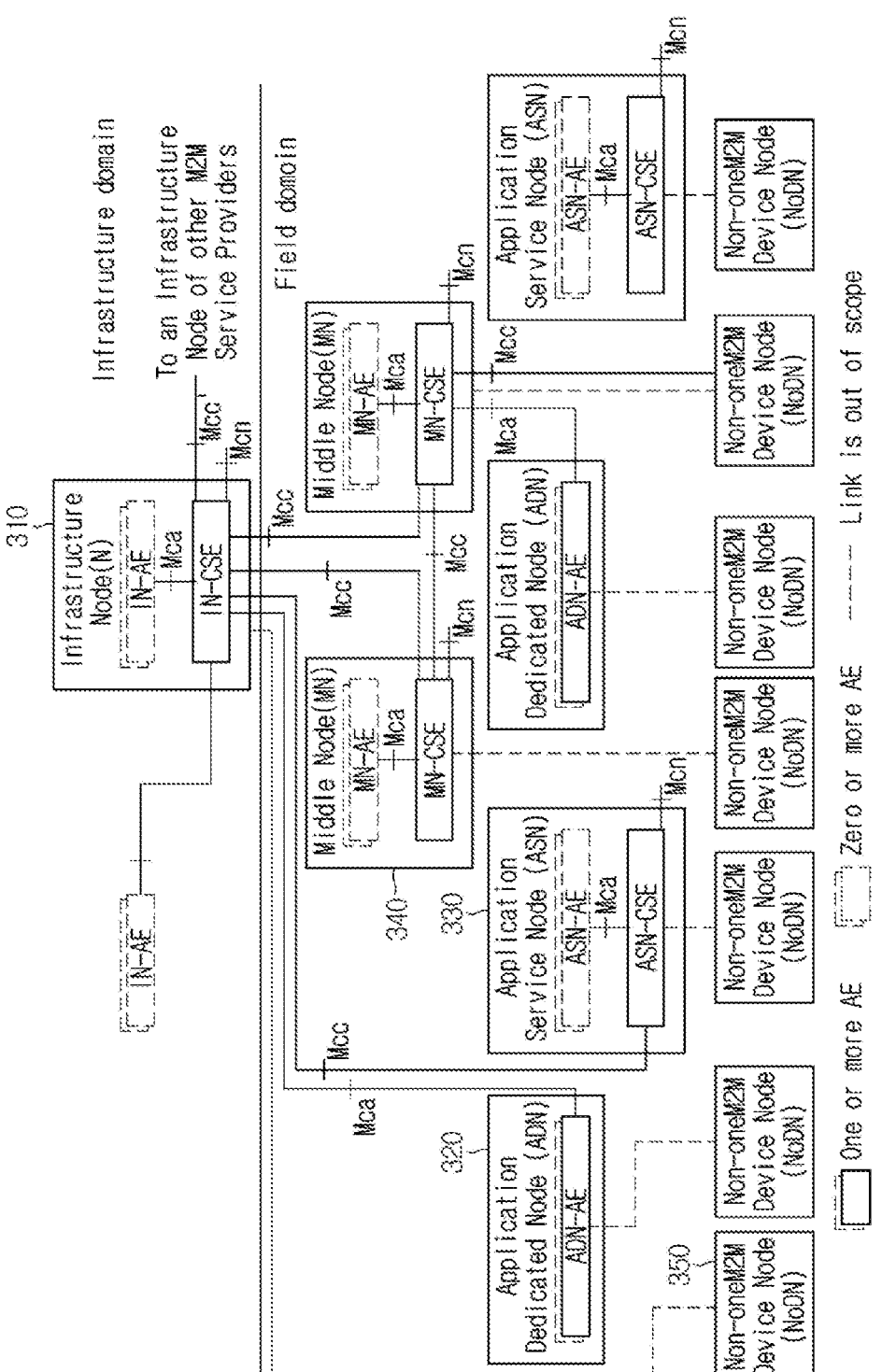
FIG. 3 is a view illustrating each node in an M2M system according to the present disclosure.

FIG. 3 is a view illustrating each node in an M2M system according to the present disclosure.

Referring to FIG. 3, an infrastructure domain of a specific M2M service provider may provide a specific infrastructure node (IN) 310. Herein, the CSE of the IN may perform communication based on the AE and thereference point Mcaof another infrastructure node. In this case, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. Here, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In this case, an ASN may be a node connected to an IN. For example, an ASN may be a node that is set in an M2M terminal in hardware.

In addition, a middle node (MN) 340 may be a node including a CSE and including zero or more AEs. Here, the MN may be set in the field domain. An MN may be connected to another MN or IN based on a reference point. In addition, for example, an MN may be set in an M2M gateway in hardware.

In addition, as an example, a non-M2M terminal node 350 (Non-M2M device node, NoDN) is a node that does not include M2M entities. It may be a node that performs management or collaboration together with an M2M system.

Figure 4:
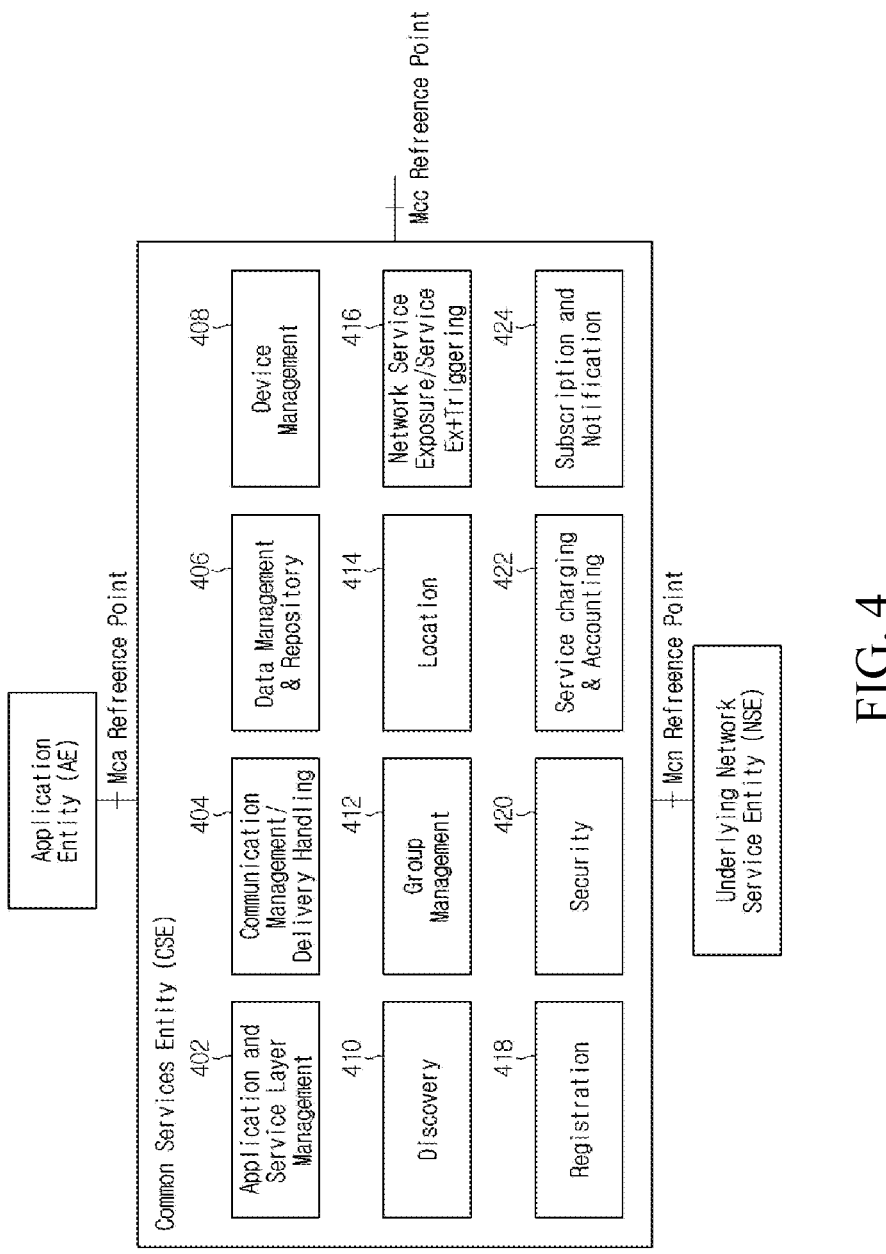
FIG. 4 is a view illustrating a common service function in an M2M system according to the present disclosure.

FIG. 4 is a view illustrating a common service function in an M2M system according to the present disclosure.

Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described embodiment.

The application and service layer management 402 CSF provides management of AEs and CSEs. The application and service layer management 402 CSF includes not only the configuring, problem solving and upgrading of CSE functions but also the capability of upgrading AEs.

The communication management and delivery handling 404 CSF provides communications with other CSEs, AEs and NSEs. The communication management and delivery handling 404 CSF determines at what time and through what connection communications are to be delivered, and also determines to buffer communication requests so that the communications can be delivered later, if necessary and permitted.

The data management and repository 406 CSF provides data storage and transmission functions (for example, data collection for aggregation, data reformatting, and data storage for analysis and sematic processing).

The device management 408 CSF provides the management of device capabilities in M2M gateways and M2M devices.

The discovery 410 CSF provides an information retrieval function for applications and services on the basis of filter criteria.

The group management 412 CSF provides processing of group-related requests. The group management 412 CSF enables an M2M system to support bulk operations for many devices and applications.

The location 414 CSF provides a function of enabling AEs to obtain geographical location information.

The network service exposure/service execution and triggering 416 CSF manages communications with base networks for access to network service functions.

The registration 418 CSF provides a function of registering AEs (or other remote CSEs) to a CSE. The registration 418 CSF allows AEs (or remote CSE) to use services of CSE.

The security 420 CSF provides a service layer with security functions like access control including identification, authentication and permission.

The service charging and accounting 422 CSF provides charging functions for a service layer.

The subscription/notification 424 CSF provides a function of allowing subscription to an event and notifying the occurrence of the event.

Figure 5:
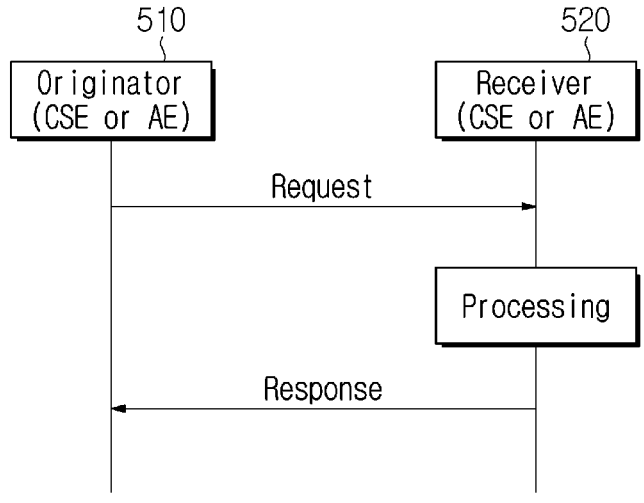
FIG. 5 is a view illustrating that an originator and a receiver exchange a message in an M2M system according to the present disclosure.

FIG. 5 is a view illustrating that an originator and a receiver exchange a message in an M2M system according to the present disclosure.

Referring to FIG. 5, the originator 501 may transmit a request message to the receiver 520. Here, the originator 510 and the receiver 520 may be the above-described M2M terminals. However, the originator 510 and the receiver 520 are not limited to M2M terminals but may be other terminals. They are not limited to the above-described embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Herein, for example, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. Here, a transmission terminal-related parameter may be a parameter for the originator 510. In addition, a receiving terminal-related parameter may be a parameter for the receiver 520. In addition, an identification parameter may be a parameter required for identification of each other.

In addition, an operation parameter may be a parameter for distinguishing operations. For example, an operation parameter may be set to any one among Create, Retrieve, Update, Delete and Notify. In other words, the parameter may aim to distinguish operations.

Here, when receiving a request message from the originator 510, the receiver 520 may process the message. For example, the receiver 520 may perform an operation included in a request message. For the operation, the receiver 520 may determine whether or not a parameter is valid and authorized. Here, if a parameter is valid and authorized, the receiver 520 may check whether or not there is a requested resource and may perform processing accordingly.

For example, in case an event occurs, the originator 510 may transmit a request message including a parameter for notification to the receiver 520. The receiver 520 may check a parameter for a notification included in a request message and may perform an operation accordingly. The receiver 520 may transmit a response message to the originator 510.

A message exchange process using a request message and a response message, as illustrated in FIG. 5, may be performed between AE and CSE on the basis of the reference point Mca or between CSEs on the basis of the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code-successful, unsuccessful, ack |
| Request Identifier-uniquely identifies a Request message |
| Content-to be transferred |
| To-the identifier of the Originator or the Transit CSE that sent the corresponding non-blocking request |
| From-the identifier of the Receiver |
| Originating Timestamp-when the message was built |
| Result Expiration Timestamp-when the message expires |
| Event Category-what event category shall be used for the response message |
| Content Status |
| Content Offset |
| Token Request Information |
| Assigned Token Identifiers |
| Authorization Signature Request Information |
| Release Version Indicator-the one M2M release version that this response message conforms to |

A filter criteria condition, which can be used in a request message or a response message, may be defined as in Table 2 and Table 3 below.

TABLE 2

| Condition tag | Multip-licity | Description |
| --- | --- | --- |
| | | Matching Conditions |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and |

TABLE 2-continued

| Condition tag | Multip-licity | Description |
| --- | --- | --- |
| | | label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator =*Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery. In the case of semantic resource discovery targeting a specific resource, if the semantic description contained in the <semanticDescriptor> of a child resource matches the semanticFilter, the URI of this child resource will be included in the semantic resource discovery result. In the case of semantic query, given a received semantic query request and its query scope, the SPARQL query statement shall be executed over aggregated semantic information collected from the semantic resource(s) in the query scope and the produced output will be the result of this semantic query. Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multip-licity | Description |
| --- | --- | --- |
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of |

TABLE 3-continued

| Condition tag | Multip-licity | Description |
|---|---|---|
| | | the child resources are returned. |
| | | If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . ./tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either manda-tory or optional according to a requested operation or a mandatory response code. For example, a request message may include at least one parameter among those listed in Table 4 below.

TABLE 4

| Request message parameter | |
|---|---|
| Mandatory | Operation-operation to be executed/CREAT, Retrieve, Update, Delete, Notify |
| | To-the address of the target resource on the target CSE |
| | From-the identifier of the message Originator |
| | Request Identifier-uniquely identifies a Request message |
| Operation | Content-to be transferred |
| dependent | Resource Type-of resource to be created |
| Optional | Originating Timestamp-when the message was built |
| | Request Expiration Timestamp-when the request message expires |
| | Result Expiration Timestamp-when the result message expires |
| | Operational Execution Time-the time when the specified operation is to be executed by the target CSE |
| | Response Type-type of response that shall be sent to the Originator |
| | Result Persistence-the duration for which the reference containing the responses is to persist |
| | Result Content-the expected components of the result |
| | Event Category-indicates how and when the system should deliver the message |
| | Delivery Aggregation-aggregation of requests to the same target CSE is to be used |
| | Group Request Identifier-Identifier added to the group request that is to be fanned out to each member of the group |
| | Group Request Target Members-indicates subset of members of a group |
| | Filter Criteria-conditions for filtered retrieve operation |
| | Desired Identifier Result Type-format of resource identifiers returned |
| | Token Request Indicator-indicating that the Originator may attempt Token Request procedure (for Dynamic Authorization) if initiated by the Receiver |
| | Tokens-for use in dynamic authorization |
| | Token IDs-for use in dynamic authorization |
| | Role IDs-for use in role based access control |
| | Local Token IDs-for use in dynamic authorization |
| | Authorization Signature Indicator-for use in Authorization Relationship Mapping |
| | Authorization Signature-for use in Authorization Relationship Mapping |
| | Authorization Relationship Indicator-for use in Authorization Relationship Mapping |
| | Semantic Query Indicator-for use in semantic queries |

TABLE 4-continued

| Request message parameter |
| --- |
| Release Version Indicator-the oneM2M release version that this request message conforms to.<br>Vendor Information |

A normal resource includes a complete set of representations of data constituting the base of information to be managed. Unless qualified as either "virtual" or "announced", the resource types in the present document are normal resources.

A virtual resource is used to trigger processing and/or a retrieve result. However, a virtual resource does not have a permanent representation in a CSE.

An announced resource contains a set of attributes of an original resource. When an original resource changes, an announced resource is automatically updated by the hosting CSE of the original resource. The announced resource contains a link to the original resource.

Resource announcement enables resource discovery. An announced resource at a remote CSE may be used to create a child resource at a remote CSE, which is not present as a child of an original resource or is not an announced child thereof.

In order to support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

Resources are specified in terms of CSE. Resources are the representations of components and elements in CSE in a oneM2M system. Application data and commands representing other CSEs, AEs, and sensors are notified as means of resource representations to a CSE.

A resource is a uniquely addressable entity in a oneM2M architecture. A resource may be delivered and be manipulated using CRUD (Create Retrieve Update Delete) operations.

A child resource is a sub-resource of another resource that is a parent resource. A parent resource includes reference for at least one child resource.

An attribute stores information associated to a resource. When a set of attributes is not common to all the resources, the set of attributes is not enumerated in a graphic representation of a resource.

Attributes are classified into universal attributes, common attributes, and resource-specific attributes. A universal attribute appears to every resource, and a common attribute appears to a plurality of resources and has a same meaning wherever it appears.

Examples of attributes, which are virtual or not declared and are general and universal to every resource type, are shown in Table 5 below.

TABLE 5

| Attribute Name | Description |
| --- | --- |
| resourceType | Resource Type. This Read Only (assigned at creation time. and then cannot be changed) attribute identifies the type of the resource as specified in clause 9.6. Each resource shall have a resourceType attribute. |
| resourceID | This attribute is an identifier for the resource that is used for 'non-hierarchical addressing method', i.e. this attribute shall contain the 'Unstructured-CSE-relative-Resource-ID' format of a resource ID as defined in table 7.2-1. This attribute shall be provided by the Hosting CSE when it accepts a resource creation procedure. The Hosting CSE shall assign a resourceID which is unique in that CSE. |
| resourceName | This attribute is the name for the resource that is used for 'hierarchical addressing method' to represent the parent-child relationships of resources. See clause 7.2 for more details. This attribute may be provided by the resource creator. The Hosting CSE shall use a provided resourceName as long as it does not already exist among child resources of the targeted parent resource. If the resourceName already exists, the Hosting CSE shall reject the request and return an error to the Originator. The Hosting CSE shall assign a resourceName if one is not provided by the resource creator. |
| parentID | This attribute is the resourceID of the parent of this resource. The value of this attribute shall be NULL for the <CSEBase> resource type. |
| creationTime | Time/date of creation of the resource.This attribute is mandatory for all resources and the value is assigned by the system at the time when the resource is locally created. Such an attribute cannot be changed. |
| lastModifiedTime | Last modification time/date of the resource.The lastModifiedTime value is set by the Hosting CSE when the resource is created, and the lastModifiedTime value is updated when the resource is updated. |

Examples of attributes, which are virtual or not declared and are general and commonly used in not all but multiple resource types, are shown in Table 6 below.

TABLE 6

| Attribute Name | Description |
|---|---|
| accessControlPolicyIDs | The attribute contains a list of identifiers for <accessControlPolicy> resources. The privileges defined in the <accessControlPolicy> resources that are referenced determine who is allowed to access the resource containing this attribute for a specific purpose (e.g. Retrieve, Update, Delete, etc.).<br>For an Update or Delete operation to a resource, the update or delete of the accessControlPolicyIDs attribute, if applicable, shall be performed prior to the update or delete of any other attributes of the resource.<br>To update this attribute, a Hosting CSE shall check whether an Originator has Update privilege in any selfPrivileges, regardless of privileges, of the <accessControlPolicy> resources which this attribute originally references.<br>After successful update of the accessControlPolicyIDs attribute, resource access checking for other attributes to be updated shall use the new privileges defined in the <accessControlPolicy> resource(s) that are referenced by the newly updated accessControlPolicyIDs attribute.<br>Similarly, to delete this attribute, a Hosting CSE shall check whether an Originator has Updateprivilege in any selfPrivileges, regardless of privileges, of the <accessControlPolicy> resources which this attribute originally references.<br>After successful deletion of the accessControlPolicyIDs attribute, resource access checking for other attributes to be deleted shall use the default access privileges as described in the following paragraphs.<br>If a resource type does not have an accessControlPolicyIDs attribute definition, then the accessControlPolicyIDs for that resource is governed in a different way, for example, the accessControlPolicy associated with the parent may apply to a child resource that does not have an accessControlPolicyIDs attribute definition, or the privileges for access are fixed by the system. Refer to the corresponding resource type definitions and procedures to see how access control is handled in such cases.<br>If a resource type does have an accessControlPolicyIDs attribute definition, but the (optional) accessControlPolicyIDs attribute value is not set in a resource instance, then the Hosting CSE shall apply the concept of the default access policy. The default policy shall provide unrestricted access only to the Originator of the successful resource creation request. All other entities shall be denied to access the resource. For that purpose, the Hosting CSE shall keep that Originator information of the resource. Note that how to keep that information is implementation specific. The default access policy is not applied to a resource which has a value assigned to the accessControlPolicyIDs attribute.<br>All resources are accessible if and only if the privileges (i.e. configured as privileges or selfPrivileges attribute of <accessControlPolicy> resource) allow it, therefore all resources shall have an associated accessControlPolicyIDs attribute, either explicitly (setting the attribute in the resource itself) or implicitly (either by using the parent privileges or the system default policies). Which means that the system shall provide default access privileges in case that the Originator does not provide a specific accessControlPolicyIDs during the creation of the resource. |
| expirationTime | Time/date after which the resource will be deleted by the Hosting CSE. This attribute can be provided by the Originator, and in such a case it will be regarded as a hint to the Hosting CSE on the lifetime of the resource. The Hosting CSE shall configure the expirationTime value. If the Hosting CSE configures the new expirationTime attribute value rather than the Originator suggested value, the new value can be sent back to the Originator depending on the Result Content value. The lifetime of the resource can be extended by providing a new value for this attribute in an UPDATE operation. Or by deleting the attribute value, e.g. by updating the attribute with NULL when doing a full UPDATE, in which case the Hosting CSE can decide on a new value.<br>If the Originator does not provide a value in the CREATE operation the system shall assign an appropriate value depending on its local policies and/or M2M service subscription agreements.<br>A resource is known as 'obsolete' when the resource contains the attribute "expirationTime" and the lifetime of this resource has reached the value of this attribute. If the 'obsolete' resource had a reference to an Application Entity Resource ID, the Hosting CSE |

TABLE 6-continued

| Attribute Name | Description |
| --- | --- |
| | shall send a NOTIFY request to the IN-CSE, requesting to delete the entry from the <AEContactList> resource. |
| stateTag | An incremental counter of modification on the resource. When a resource is created, this counter is set to 0, and it will be incremented on every modification of the resource (see notes 1 and 2). |
| announceTo | This attribute may be included in a CREATE or UPDATE Request in which case it contains a list of addresses/CSE-IDs where the resource is to be announced. For the case that CSE-IDs are provided, the announced-to CSE shall decide the location of the announced resources based on the rules described in clause 9.6.26. For the original resource, this attribute shall only be present if it has been successfully announced to other CSEs. This attribute maintains the list of the resource addresses to the successfully announced resources. Updates on this attribute will trigger new resource announcement or de-announcement.<br>If announceTo attribute includes resource address(s), the present document does not provide any means for validating these address(s) for announcement purposes. It is the responsibility of the Hosting-CSE referenced by the resource address(s) to validate the access privileges of the originator of the Request that triggers the announcement. |
| announcedAttribute | This attributes shall only be present at the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| labels | Tokens used to add meta-information to resources.This attribute is optional.<br>The value of the labels attribute is a list of individual labels, each of them being:<br>Either a standalone label-key, used as a simple "tag", that can be used for example for discovery purposes when looking for particular resources that one can "tag" using that label-key<br>Or a composite element made of a label-key and a label-value, separated by a special character defined in [3].<br>The list of allowed characters in a label (and in label-keys and label-values) and separator characters is defined in [3], clause 6.3.3. |
| e2eSecInfo | Present in a resource representing an AE or CSE. Indicates the end-to-end security capabilities supported by the AE or CSE. May indicate supported end-to-end security frameworks. May also contains a certificate or credential identifier used by the AE or CSE. May include random values for use in end-to-end security protocols. The details of this attributes are described in oneM2M TS-0003 [2]. This attribute is optional and if not present it means that the represented entity does not support oneM2M end-to-end security procedures. |
| DynamicAuthorization Consultati onIDs | This attribute contains a list of identifiers of <dynamicAuthorizationConsultation> resources. The information defined in a <dynamicAuthorizationConsultation> resource is used by a CSE for initiating consultation-based dynamic authorization requests.<br>Consultation-based dynamic authorization is only performed for a targeted resource if and only if it is linked to an enabled <dynamicAuthorizationConsultation> resource.<br>If the attribute is not set or has a value that does not correspond to a valid <dynamicAuthorizationConsultation> resource(s), or it refers to an <dynamicAuthorizationConsultation> resource(s) that is not reachable, then the dynamicAuthorizationConsultationIDs associated with the parent may apply to the child resource if present, or a system default <dynamicAuthorizationConsultation> may apply if present. |

A oneM2M system supports an expiration timer for deleting a resource from a hosting CSE after a specific amount of time/specific date. An IoT service having a temporary access and characteristic may use the expiration timer. By the expiration timer, the resource may be deleted after a given time interval. A oneM2M mechanism for deleting current data is limited for supporting various emerging IoT/M2M applications. For example, in case of a chat application using an image/photo, when a received data is read by a user, the data is deleted within 10 seconds, but when the data is not read by the user, the data is deleted after 24 hours. As another example, in case of a service related to security and privacy, no data related to personal information should be shared by other users and be stored in a platform. In case of a medical and wearable IoT service, medical data should be read only by a dedicated medical expert (e.g., doctor), and the data should be deleted thereafter.

As described above, depending on a characteristic of data or an application, an algorithm is needed to delete data under a predetermined condition. Herein, the predetermined condition is not only the passage of a specific time but also needs to be defined in various ways. For example, a condition of data deletion may be associated to an operation (e.g., read, retrieve, etc.) for the corresponding data.

For this reason, the present disclosure proposes a method for deleting data based on an operation for the data. According to an embodiment of the present disclosure, a volatile feature may be given to data. The volatile feature may be given to a resource storing the data. Hereinafter, 'creation of a resource' will be used in the same meaning as 'creation of data', and 'deletion of a resource' will be used in the same meaning as 'deletion of data'. When no volatile feature is used, the deletion of a resource after the completion of an operation may be performed at an explicit request. The procedure is illustrated in FIG. 6 below.

Figure 6:
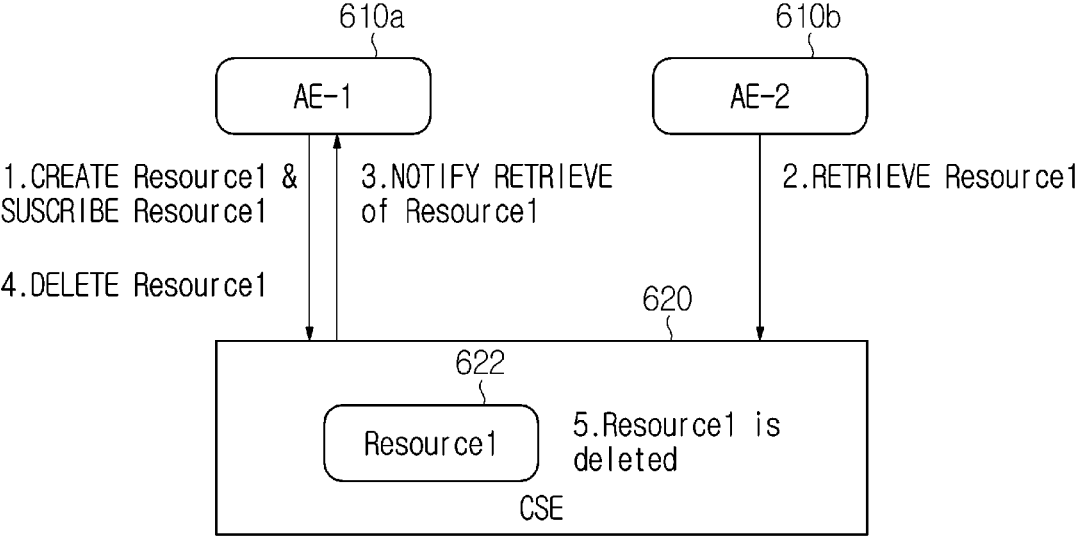
FIG. 6 is a view illustrating a procedure by which a resource is deleted according to an explicit request in an M2M system according to the present disclosure.

FIG. 6 is a view illustrating a procedure by which a resource is deleted according to an explicit request in an M2M system according to the present disclosure. In FIG. 6, an AE-1 610a is a producer creating a resource, and an AE-2 610b is a consumer using data. Although it is illustrated that the AE-1 610a and the AE-2 610b are different entities, the AE-1 610a and the AE-2 610b may be a same entity in some cases.

Referring to FIG. 6, the AE-1 610a requests a CSE 620 to create and subscribe <Resource1> 622. Accordingly, the CSE 620 creates <Resource1> 622. Herein, the AE-1 610a predetermines that, after being created, <Resource1> 622 be deleted when it is read by any user. For example, <Resource1> 622 is a placeholder for storing data from the AE-1 610a and is estimated to be consumed by the AE-2 610b.

Next, the AE-2 610b retrieves <Resource1> 622 stored in the CSE 620. That is, the AE-2 610b reads <Resource1> 622. Accordingly, the CSE 620 notifies the AE-1 610a that <Resource1> 622 is retrieved. Being notified by the CSE 620 of retrieving of <Resource1> 622, in order to delete <Resource1> 622, the AE-1 610a requests the CSE 620 to delete <Resource1> 622. The CSE 620 deletes <Resource1> 622 at the request of the AE-1 610a.

As in the procedure described with reference to FIG. 6, when an AE does not notify that a volatile feature is given to data or a resource, the AE monitors the occurrence of an event for the resource (e.g., retrieve or read) and explicitly requests deletion. Accordingly, the present disclosure proposes a method for deleting a resource without explicit request by notifying the existence of a volatile feature when the resource is created. In this case, the procedure of FIG. 6 may be modified as shown in FIG. 7.

Figure 7:
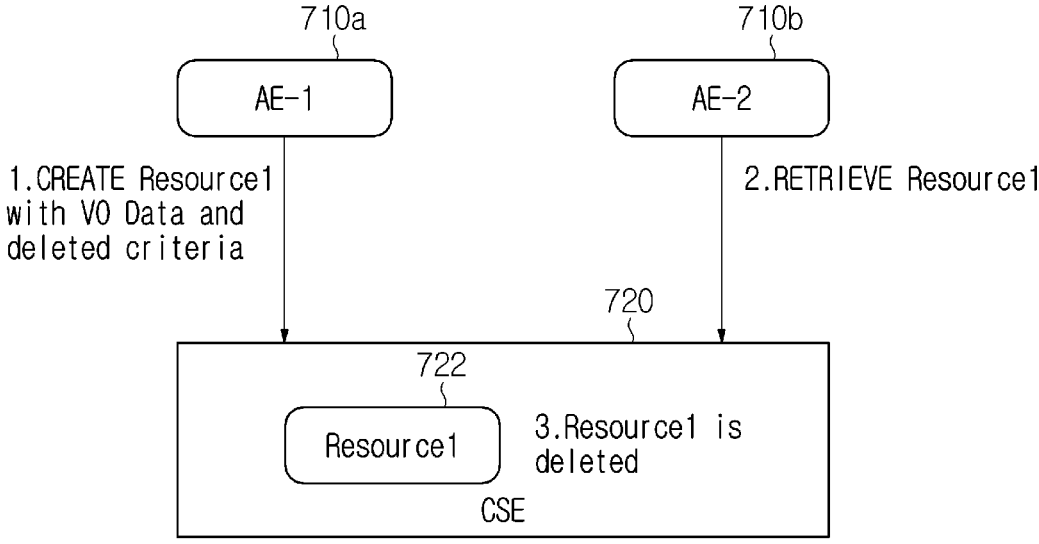
FIG. 7 is a view illustrating a procedure by which a resource is deleted according to a volatile feature in an M2M system according to the present disclosure.

FIG. 7 is a view illustrating a procedure by which a resource is deleted according to a volatile feature in an M2M system according to the present disclosure. In FIG. 7, an AE-1 710a is a producer creating a resource, and an AE-2 710b is a consumer using data. Although it is illustrated that the AE-1 710a and the AE-2 710b are different entities, the AE-1 710a and the AE-2 710b may be a same entity in some cases.

Referring to FIG. 7, the AE-1 710a requests a CSE 720 to create and subscribe <Resource1> 722. Accordingly, the CSE 720 creates <Resource1> 722. Herein, <Resource1> 722 is created with a volatile feature, and deleting criteria are delivered to the CSE 720 together. Herein, the deleting criteria may be delivered in various ways according to various embodiments described below. Next, the AE-2 710b retrieves <Resource1> 722 stored in the CSE 720. That is, the AE-2 710b reads <Resource1> 722. Next, according to the volatile feature of <Resource1> 722 and the deleting criteria, the CSE 720 deletes <Resource1> 722.

As in the procedure described with reference to FIG. 7, signaling for deleting a resource may be omitted by notifying a CSE creating the resource that the resource has a volatile feature.

A condition for deleting a resource having a volatile feature may be defined variously. In addition, different attributes may be used according to conditions. An example of an attribute used according to each condition is shown in Table 7 below. Table 7 is one example of high-level use cases of attributes for resource deletion.

TABLE 7

| Conditions | Attributes being used |
|---|---|
| An IoT system performs self-deleting of a resource after a given expiration time. | Expiration timer (e.g., expirationTime) |
| An IoT system performs self-deleting after a resource is read by a user. | Read counter |
| An IoT system performs self-deleting after a resource is read by a specific user. | Access right, read counter |
| An IoT system performs self-deleting after a resource is accessed by anyone but a specific user. | User identifier, user read counter |
| An IoT system performs self-deleting after a resource is read a specific number of times by a user (e.g., deletes the resource when it is read three times). | Read counter |

Figure 8:
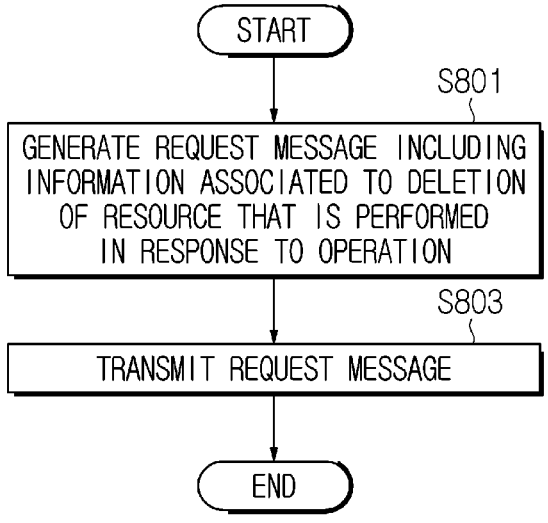
FIG. 8 is a view illustrating a method for operating a device requesting creation of a request in an M2M system according to the present disclosure.

FIG. 8 is a view illustrating a method for operating a device requesting creation of a request in an M2M system according to the present disclosure. The operation subject of FIG. 8 may be an AE of a device requesting creation of a resource. Hereinafter, the operation subject of the procedure in FIG. 8 is referred to as 'device'.

Referring to FIG. 8, in the step S801, the device generates a request message including information associated to deletion of a resource, which is performed in response to an operation. The request message may be a message requesting creation of the resource including information associated to the deletion of the resource. Herein, the operation is related to the resource to be deleted and may be, for example, a reading operation (e.g., RETRIEVE). As another example, the operation may be at least one of UPDATE, CREATE, DELETE, or NOTIFY. According to an embodiment, information associated to deletion of a resource may include at least one of information indicating that the resource is deleted in response to a specific operation, information indicating the resource to be deleted, information indicating an operation that is a condition of deletion, information indicating a content of the condition (e.g., the number of times of the operation), or information for identifying an entity that performs an operation causing deletion. For example, the information associated to the deletion of the resource may have a type of counter that decreases according to the occurrence of the operation.

In the step S803, the device transmits the request message. Accordingly, a condition for deleting a resource specified by the request message is set by a counterpart device, and the resource may be deleted without separate explicit request, when the set condition is satisfied. Herein, the request message may be a message requesting creation of a resource to be deleted or a different message from the message requesting the creation of the resource. When the request message is the deferent message from the message requesting the creation of the resource to be deleted, although not illustrated in FIG. 8, the device may transmit the message requesting the creation of the resource to be deleted prior to the current step S803.

Figure 9:
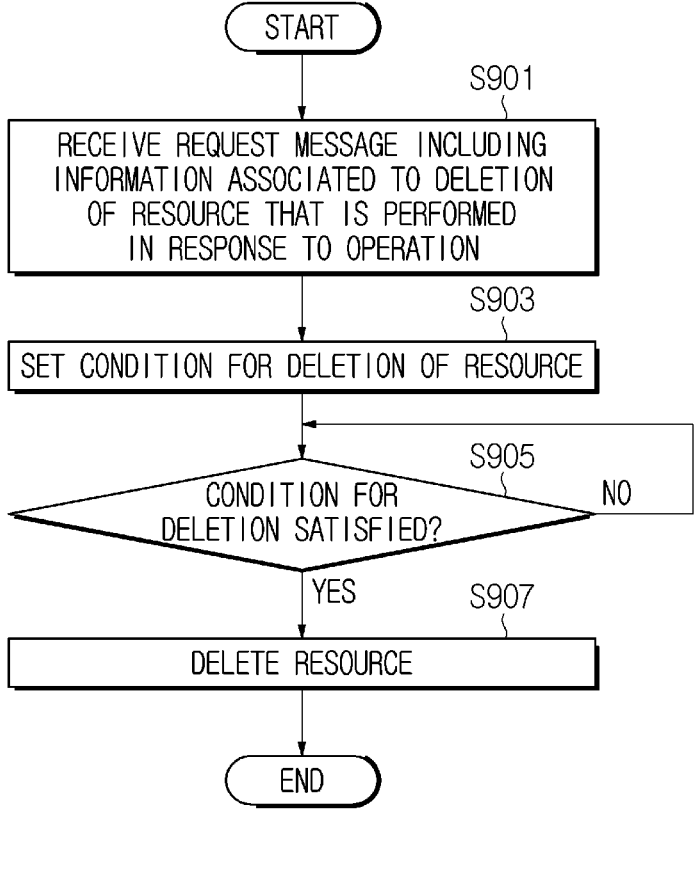
FIG. 9 is a view illustrating a method for operating a device creating a resource in an M2M system according to the present disclosure.

FIG. 9 is a view illustrating a method for operating a device creating a resource in an M2M system according to the present disclosure. The operation subject of FIG. 9 may be a service layer or CSE of a device requesting creation of a resource. Hereinafter, the operation subject of the procedure in FIG. 9 is referred to as 'device'.

Referring to FIG. 9, in the step S901, the device receives a request message including information associated to deletion of a resource, which is performed in response to an operation. The request message may be a message requesting creation of the resource including information associated to the deletion of the resource. Herein, the operation is related to the resource to be deleted and may be, for example, a reading operation (e.g., RETRIEVE). As another example, the operation may be at least one of UPDATE, CREATE, DELETE, or NOTIFY. According to an embodiment, information associated to deletion of a resource may include at least one of information indicating that the resource is deleted in response to a specific operation, information indicating the resource to be deleted, information indicating an operation that is a condition of deletion, information indicating a content of the condition (e.g., the number of times of the operation), or information for identifying an entity that performs an operation causing deletion. For example, the information associated to the deletion of the resource may have a type of counter.

In the step S903, the device sets a condition for deleting a resource. That is, the device sets the condition for deleting the resource based on information associated to deleting the resource, which is included in the request message. For example, when the information on deleting the resource indicates a number of times of a specific operation (e.g., RETRIEVE), the device may generate a parameter representing a remaining number of times of the specific operation as the condition for deleting the resource.

In the step S905, the device checks whether or not the condition for deleting the resource is satisfied. For example, when the condition is a number of times of a specific operation, the device checks whether or not the number of times the operation for the resource is performed has reached a specified number of times. To this aim, the device may decrease a counter initialized to a specified number of times every time the operation occurs.

When the condition of deletion is satisfied, in the step S907, the device deletes the resource. However, regardless of whether or not the condition of deletion is satisfied, the resource may be deleted at a separate request. When the resource is deleted at the request before the condition of deletion is satisfied, the device may stop the current procedure without performing the steps S905 and S907.

Figure 10:
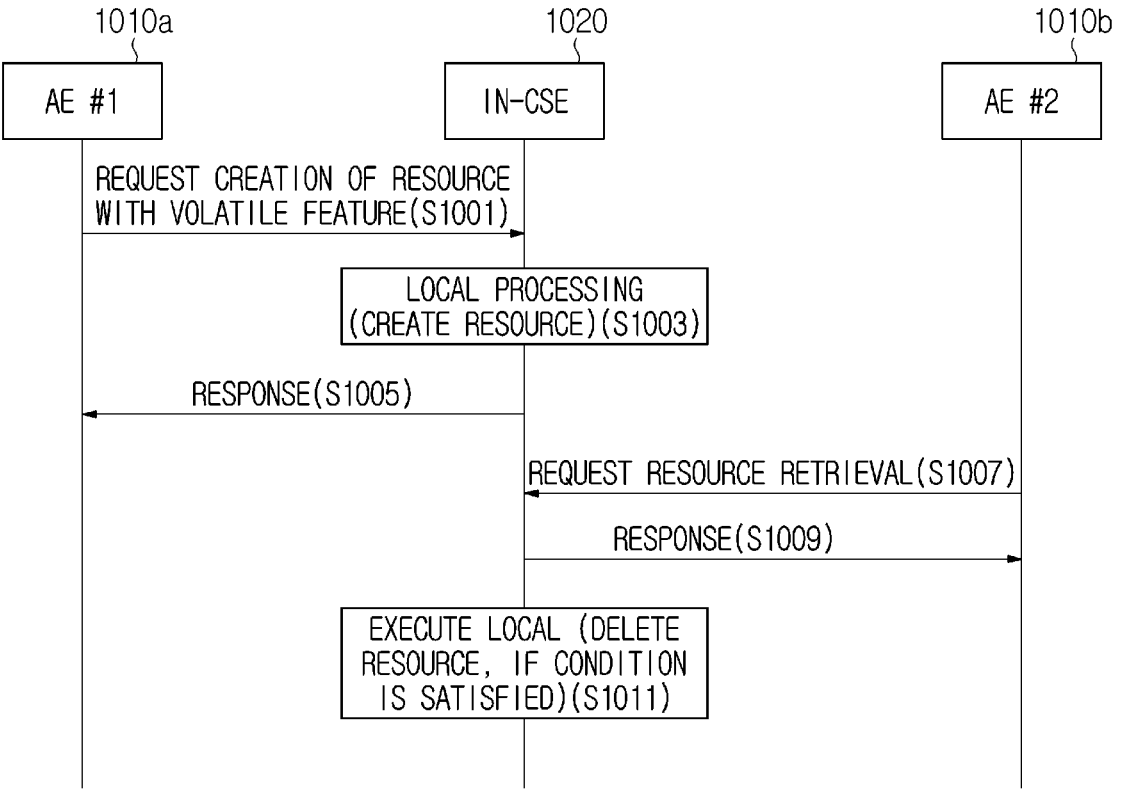
FIG. 10 is a view illustrating an example of a procedure for creating and deleting a resource having a volatile feature in an M2M system according to the present disclosure.

FIG. 10 is a view illustrating an example of a procedure for creating and deleting a resource having a volatile feature in an M2M system according to the present disclosure.

Referring to FIG. 10, in the step S1001, an AE #1 1010a requests creation of a resource having a volatile feature. That is, the AE #1 1010a transmits a request message about the creation of the resource, and the request message includes information indicating the volatile feature of the resource. In addition, the request message may include further information notifying a condition for deleting the resource.

In the step S1003, the IN-CSE 1020 performs local processing. In other words, the IN-CSE 1020 creates the requested resource having given volatile information. That is, the IN-CSE 1020 creates the requested resource and sets a condition for deleting the resource. In the step S1005, the IN-CSE 1020 transmits a response message to the AE #1 1010a.

In the step S1007, the AE #2 1010b transmits a request message for resource retrieval to the IN-CSE 1020. Herein, the request message requests retrieval of the resource that is created by the request message of the step S1001. In the step S1009, the IN-CSE 1020 transmits a response message to the AE #2 1010b. The response message may include data included in the requested resource.

In the step S1011, the IN-CSE 1020 performs local processing. In other words, the IN-CSE 1020 deletes the resource, when the condition for deletion is satisfied. That is, the deletion condition may be satisfied by the request of the step S1007. In this case, the IN-CSE 1020 deletes the resource that is created in the step S1003. On the other hand, when the condition is not satisfied, the IN-CSE 1020 may not delete the resource.

As described above, a volatile feature of a resource may be set. To this aim, through an operation of creating a resource or a separate operation, an AE delivers information on a condition for deleting the resource to a hosting CSE. Next, the hosting CSE sets a condition based on the delivered information. Hereinafter, various embodiments of the information thus delivered or information indicating the set condition are described.

According to an embodiment, as information on deletion of a resource, readCounter/readDeleteCounter may be defined. An IoT system performs self-deleting after a resource is read by a user. To this aim, readCounter/readDeleteCounter may be defined as a common attribute in Table 8.

TABLE 8

| Attribute Name | Description |
| --- | --- |
| readCtr | An incremental counter of retrieval on the resource. When a resource is created, this counter is set to 0, and it will be incremented on every read of the resource |
| readDeletionCtr | An incremental counter of retrieval on the resource used for self-deletion. When a resource is created, this counter is set to 0, and it will be incremented on every read of the resource. When the counter reaches to the predefined readDeletionCtr, the resource will be deleted. |

As readDeletionCtr includes a self-deleting indication, it is different from readCtr. readCtr may be used for deletion using another self-deleting indication, which means that readCtr may be used for a different operation. However, readDeletionCtr includes a self-deleting indication, and thus a resource may be deleted with no other deletion request or indication. This new type of common attributes may be created simultaneously when a resource is created. When an originator wants to create a new resource in a hosting CSE, the originator may transmit a request together with information on resource information including some attributes to the hosting CSE. readCtr and/or readDeletionCtr may be included in a creation request message. Based on a counter, a resource may be deleted without interruption of the originator, and a procedure for deleting a message is simplified and time and overhead are reduced.

According to an embodiment, as information on deletion of a resource, a volatile attribute may be defined. That is, volatileAttr may be added as an attribute. The added attribute may be defined as one of common attributes. Alternatively, the added attribute may be an attribute for data associated to a resource like contentInstance or container. The attribute provides a condition and information on deletion of a resource. For example, the attribute may include an indication that a resource should be deleted under a specific condition. As another example, the attribute may include default behavior information set to deletion once data is read or after an expiration time even when the data is not read. As another example, the attribute may include information on such conditions as that data should not be updated for a specific time interval, that a value should be larger than a specific value, that data should be read by a specific application, and that data should be read a predetermined number of times.

volatileAttr has a role of deletion indicator. Like readCtr, another attribute may be a condition of deletion. Unlike readDeletionCtr, readCtr has no meaning of self-deleting. In order to use this type of attributes as a condition of deletion, an additional indication/instruction of deletion is needed.

Newly defined volatileAttr is easy to become a deletion indicator. For example, when an originator wants to use a predefined attribute as a condition of deletion, the originator may indicate the condition of deletion through volatileAttr, and a resource may be deleted accordingly when the indicated condition of deletion is satisfied. By indicating through volatileAttr, the originator may use another predefined attribute as a condition of deletion. In addition, as volatileAttr has the meaning of condition of deletion, no additional deletion indication is needed. Especially, in an oneM2M system, volatileAttr is very simple and effective method for self-deleting function.

According to an embodiment, as information on deletion of a resource, a volatile resource indicator may be defined. A request message may include various optional parameters. The volatile resource indicator may be added as an optional parameter that is used to indicate that a resource created with the parameter has a volatile feature. Furthermore, filter criteria describing a condition for deleting a resource may be added to the request message. When no filter criteria exist, a default behavior may be used to delete a read resource. The volatile resource indicator may be applied to CREATE operation. The volatile resource indicator may be defined as in Table 9 below.

TABLE 9

| Request message parameter | | Create | Re-trieve | Up-date | Delete | Notify |
|---|---|---|---|---|---|---|
| Option-al | Volatile Resource Indicator - when to delete a resource for security & privacy reason | O | N/A | N/A | N/A | N/A |

Like volatileAttr, a volatile resource indicator may be a very simple and effective method for self-deleting function. According to an embodiment, as information on deletion of a resource, deleteReadCtr may be defined. deleteReadCtrs may be defined as an optional parameter that is used to indicate that a resource created with the parameter should be deleted, when it has a value of 0. The initial value of the parameter is larger than 0 and decreases every time the resource is read.

According to an embodiment, as information on deletion of a resource, deleteCtr and readCtr may be defined. deleteCtr may be defined as an optional parameter that is used to indicate that a resource created with the parameter should be deleted, when the value of readCtr is the same as the value of deleteCtr. The initial value of deleteCtr is larger than 0. readCtr may be defined as an optional parameter for tracking the number of times of Read operation for a resource with the parameter. The initial value of readCtr is 0 and increases every time the resource is read.

According to an embodiment, as information on deletion of a resource, counters for each operation (e.g., createCtr, readCtr, WriteCtr, deleteCtr, and notifyCtr) may be defined. A system may have an individual counter for each operation in order to track the number of times of each operation for a resource. createCtr, readCtr, WriteCtr, deleteCtr and notifyCtr are intended for a Create operation, a Retrieve operation, an Update operation, a Delete operation, and a Notify operation respectively. deleteCtr may be defined as an optional parameter that is used to indicate that a resource created with the parameter should be deleted, when the value of a counter of a specific operation is the same as the value of deleteCtr. The initial value of the parameter is larger than 0, and a target operation (e.g., read, write, notify) may be designated. For example, the value '1:READ' may be understood to mean that a resource is deleted when a RETRIEVE operation is executed once for the resource.

According to an embodiment, as information on deletion of a resource, operationCtr and deleteCtr may be defined. operationCtr may be defined as an optional parameter used to count the number of times of a specific operation. The parameter may consist of 5 tuples having integer values corresponding to CREATE, RETRIEVE, UPDATE, DELETE, and NOTIFY. Each tuple has an initial value of 0 and increases when a corresponding operation is executed for a resource. For example, when there is a RETRIEVE operation for a resource, the second tuple increases, resulting in <0, 1, 0, 0, 0>. operationCtr may be used for another purpose. For example, a tuple corresponding to RETRIEVE may be used to delete a resource, when the resource is read by a user a specific number of times. deleteCtr may be defined as an optional parameter that is used to indicate that a resource created with the parameter should be deleted, when the value of a counter of a specific operation is the same as the value of deleteCtr. The initial value of the parameter is larger than 0, and a target operation (e.g., read, write, notify) may be designated. For example, the value '1:READ' may be understood to mean that a resource is deleted when a RETRIEVE operation is executed once for the resource.

Figure 11:
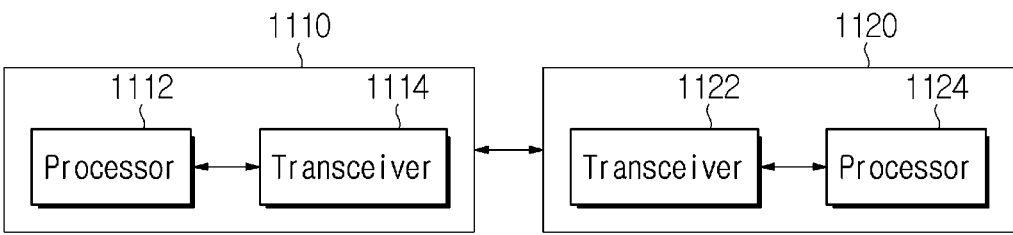
FIG. 11 is a view illustrating a configuration of M2M devices in an M2M system according to the present disclosure.

FIG. 11 is a view illustrating a configuration of M2M devices in an M2M system according to the present disclosure.

Referring to FIG. 11, the M2M device 1110 may include the processor 1112 controlling a device and the transceiver 1114 transmitting and receiving a signal. Here, the processor 1112 may control the transceiver 1114. In addition, the M2M device 1110 may perform a communication with another M2M device 1120. Another M2M device 1120 may also include the processor 1122 and the transceiver 1124, and the processor 1122 and the transceiver 1124 may perform the same function as the processor 1112 and the transceiver 1114.

For example, the originator and the receiver, which are described above, may be one of the M2M devices 1110 and 1120 of FIG. 11, respectively. In addition, the devices 1110 and 1120 of FIG. 11 may be different devices. For example, the devices 1110 and 1120 of FIG. 11 may be communication devices, vehicles or base stations. In other words, the devices 1110 and 1120 of FIG. 11 refer to devices, which can perform a communication, and are not limited to the above-described embodiments.

According to the above-described embodiments of the present disclosure, a resource may be deleted without explicit request but under a set condition. A resource with a volatile feature, which is deleted without explicit request, may be applied to various scenarios. For example, examples of utilizing a resource with a volatile feature are as follows.

Figure 12:
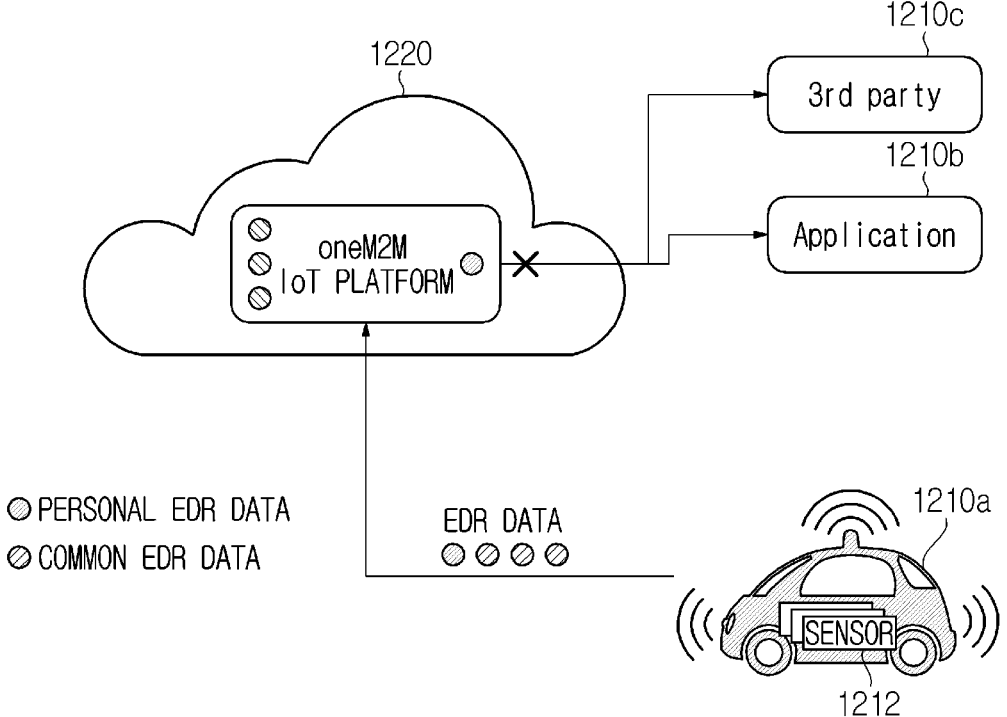
FIG. 12 is a view illustrating an example of utilizing a resource having a volatile feature in an M2M system according to the present disclosure.

FIG. 12 is a view illustrating an example of utilizing a resource having a volatile feature in an M2M system according to the present disclosure. Referring to FIG. 12, a vehicle 1210*a* equipped with a sensor 1212 operates as an AE and transmits event data recorder (EDR) data to a oneM2M IoT platform 1220. The EDR data may be stored in the oneM2M IoT platform 1220 and be read by an application 1210*b* or a 3rd party 1210*c*.

In the automobile industry, a cloud-based EDR system is a main system feature enabling autonomous driving. Sensor data collected from the vehicle 1210*a* are transmitted to the oneM2M IoT platform 1220 for analyzing a crash or accident. As the sensor data not only are personal data but also include very sensitive information on a personally owned car, it is desirable that a service provider does not keep at least a part of event data. Accordingly, the volatile feature according to the above-described embodiments may be applied to at least a part of EDR data.

As another example, a resource with a volatile feature may be used for a health care and medical check-up service for immigrants.

Passengers occasionally check their physical status and store basic information. Physical condition is examined for epidemic disease. The health care and medical check-up service enables a fast security immigration service.

Biomedical data (e.g., temperatures, electrocardiogram (ECG) signals, etc.) are analyzed in an IoT cloud platform. An analysis result is delivered to a security gateway or officer. In case a passenger removes a wearable device (e.g., oneM2M wearable ASN), the wearable device detects the removal and removes every stored information, thereby preventing other people from maliciously use the information.

In addition, data in the cloud IoT platform may be deleted according to a rule. There may be various criteria for deleting stored data. According to various embodiments, the deletion of the stored data may be executed based on various signals from a body, a predetermined signal, and a user's location according to a detection mechanism. For example, when a paired signal of a passenger is not monitored for a given period of time, a device may delete personal information. As another example, when a specific signal is received, the device may delete the personal information. As yet another example, when the passenger enters a specific area, the device may delete the personal information.

The above-described embodiments of the present disclosure may be implemented by various means. For example, the embodiments of the present disclosure may be implemented by hardware, firmware, software, or a combination thereof.

The foregoing description of the preferred embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims. Accordingly, the present disclosure is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary.

In addition, the present disclosure has been described with reference to preferred embodiments thereof. It will be understood by those skilled in the art that various changes in form and details may be made therein without departing from the essential characteristics of the present disclosure. Therefore, the disclosed embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a machine-to-machine (M2M) device in an M2M system, the method comprising:

generating a request message requesting creation of a resource, wherein the resource comprises a <contentInstance> resource with corresponding attributes including data and a counter, wherein the counter has an initial value greater than 0 and is decremented by 1 for each RETRIEVE operation performed to the resource, wherein the RETRIEVE operation comprises another M2M device reading the data of the resource, and wherein the resource, including the data and the counter, should be deleted when the counter becomes 0; and transmitting, by a transceiver, the request message to a hosting common service entity (CSE) to create the resource, the method further comprising deleting, by the hosting CSE, the resource including the data and the counter, based on the counter becoming 0 without the hosting CSE receiving an explicit deletion request.

2. The method of claim 1, wherein the corresponding attributes further include: resourceType, resourceID, resourceName, parentID, creationTime, and lastModifiedTime.

3. The method of claim 1, wherein the data comprises one or more of the following: sensor data, security data, health or medical data, biomedical data, or personal data.

4. The method of claim 1, wherein the M2M device comprises at least one of a CSE or an application entity AE.

5. The method of claim 1, further comprising:

receiving, from the hosting CSE in response to the request message, a response message.

6. A method for operating a machine-to-machine (M2M) device in an M2M system, the method comprising:

receiving, by a transceiver, a request message requesting creation of a resource, wherein the resource comprises a <contentInstance> resource with corresponding attributes including data and a counter, wherein the counter has an initial value greater than 0 and is decremented by 1 for each RETRIEVE operation performed to the resource, wherein the RETRIEVE operation comprises another M2M device reading the data of the resource, and wherein the resource, including the data and the counter, should be deleted when the counter becomes 0;

creating the resource in response to the request message; and deleting the resource including the data and the counter based on the counter becoming 0 without the M2M device receiving an explicit deletion request.

7. The method of claim 6, wherein the corresponding attributes further include: resourceType, resourceID, resourceName, parentID, creationTime, and lastModified-Time.

8. The method of claim 6, wherein the data comprises one or more of the following: sensor data, security data, health or medical data, biomedical data, or personal data.

9. The method of claim 6, wherein the M2M device comprises at least one of a common service entity (CSE) or an application entity (AE).

10. The method of claim 6, wherein the request message is received from an application entity (AE), further comprising:

sending, to the AE in response to the request message, a response message.

11. A machine-to-machine (M2M) device in an M2M system, the M2M device comprising:

a transceiver operatively coupled to a processor, wherein the transceiver and the processor are configured to:

receive a request message requesting creation of a resource, wherein the resource comprises a <contentInstance> resource with corresponding attributes including data and a counter, wherein the counter has an initial value greater than 0 and is decremented by 1 for each RETRIEVE operation performed to the resource, wherein the RETRIEVE operation comprises another M2M device reading the data of the resource, and wherein the resource, including the data and the counter, should be deleted when the counter becomes 0;

create the resource in response to the request message; and delete the resource including the data and the counter based on the counter becoming 0 without the M2M device receiving an explicit deletion request.

12. The M2M device of claim 11, wherein the corresponding attributes further include: resourceType, resourceID, resourceName, parentID, creationTime, and lastModified-Time.

13. The M2M device of claim 11, wherein the data comprises one or more of the following: sensor data, security data, health or medical data, biomedical data, or personal data.

14. The M2M device of claim 11, wherein the M2M device comprises at least one of a common service entity (CSE) or an application entity (AE).

15. The M2M device of claim 11, wherein the transceiver and the processor are further configured to:

transmit, in response to the request message, a response message.

* * * * *